Dec. 12, 1950     J. G. KRONOUER ET AL     2,533,589
METHOD OF MAKING SEALED GLASS VESSELS
Filed Jan. 14, 1946
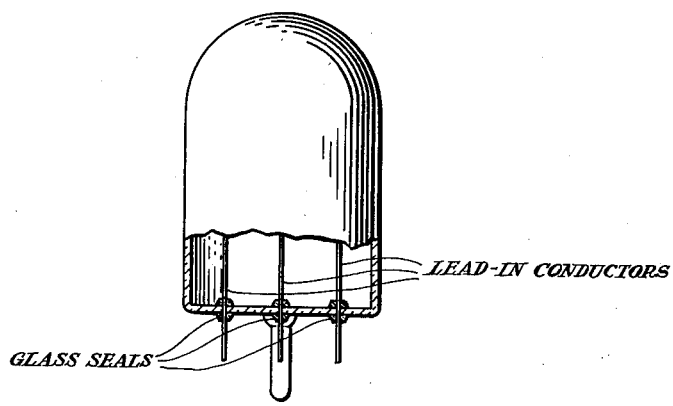
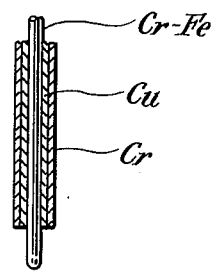
JOHAN GEORGE KRONOUER
EDUARD MARIA HENRICUS LIPS
FRITZ PRAKKE
       INVENTORS.
BY
ATTORNEY.

Patented Dec. 12, 1950

2,533,589

UNITED STATES PATENT OFFICE 2,533,589

METHOD OF MAKING SEALED GLASS VESSELS

Johan George Kronouer, Eduard Maria Henricus Lips, and Frits Prakke, Eindhoven, Netherlands, assignors, by mesne assignments, to Hartford National Bank and Trust Company, Hartford, Conn., as trustee Application January 14, 1946, Serial No. 641,183 In the Netherlands August 13, 1943

Section 1, Public Law 690, August 8, 1946 Patent expires August 13, 1963

3 Claims. (Cl. 49—81)

This invention relates to a method of manufacturing hermetically sealed vessels such as those of the electron discharge type having a wall portion consisting at least partially of glass into which conductors are hermetically sealed.

Many combinations are known for sealing conductors into glass. Thus, for example, it has been proposed to seal materials such as tungsten, molybdenum, nickel, copper, iron, chrome-iron and the like into a kind of glass which matches them as well as possible. In these cases one seal may afford a more satisfactory airtight joint than another but frequently great difficulties have to be overcome. Besides the drawbacks connected with the always existing disparity in the coefficients of expansion of metal and glass, a frequently arising drawback consists in the insufficient adherence of the glass to the metal at the temperature at which the seal is established.

In order to obtain an improvement in this respect, it is well-known to utilize borax, owing to which the glass flows out better on the metal, a more satisfactory adherence being thus obtained. However, borax has a very low melting temperature so that when utilized in conjunction with pressed glass components, the tools are clogged-up by it.

A very satisfactory sealed joint is obtained by carrying out the method according to the present invention, which method consists in that a composite wire conductor which is to be sealed into a glass wall portion of a hermetically sealed vessel, is coated with a thin layer of chromium that will be completely oxidized during the subsequent sealing of the wire and is then sealed into the said wall portion. This method affords very favourable results owing to the fact that during the sealing-in operation the thin layer of chromium is oxidised to form chromic anhydride which, owing to the fact that it is not burnt in the flame and that the glass adheres thereto very satisfactorily, affords a quite satisfactory sealed joint with glass.

The invention is particularly advantageous in making discharge tubes for short and very short waves, in which tubes the sealed-in conductors consist of a core body coated with a thin layer of a metal of high conductivity, for example, copper, silver and the like. In this case the thickness of the layer of chromium has proved to be critical. If in this case a layer of chromium having a thickness of from 5 to 10 microns is applied in any known manner, for example by electrolytic agency, there occurs a very great increase of the resistance. According to a preferred embodiment of the method according to the present invention, a copper-plated conductor is coated with a layer of chromium whose thickness does not exceed 1 micron, i. e. with a layer which is so thin that when the conductor is being sealed into glass the whole or substantially the whole of this layer is converted into chromic anhydride. Such a preferred layer may have a thickness of chromium of .5 to 1 micron and this layer is completely converted to the said anhydride during the sealing. Consequently, when used for short and very short waves the current flows, owing to the skin effect, through the layer of copper.

The invention will be explained more fully with reference to the accompanying drawing in which:

Figure 1 is an elevational view, partly in section, of an evacuated vessel;

Fig. 2 is a sectional view in elevation of lead-in conductor of the type used in the vessel shown in Fig. 1.

There is shown in Fig. 1 a vessel having lead-in conductors passing through the glass seals in the vessel wall. As shown in Fig. 2 these lead-in conductors consist of a chrome-iron core having a layer of copper positioned thereon. A layer of chromium is applied over the copper layer.

The starting material is formed by a chrome-iron conductor having a thickness of 1 mm. This conductor is electrolytically coated with the layer of copper of from 10 to 30 microns in thickness to which is applied, likewise by electrolytic agency, a layer of chromium with a maximum thickness of 1 micron. Subsequently the conductor is sealed in the ordinary manner into the glass wall of a discharge tube, the tube being finished in the known manner. The various layers may also be applied in any manner different from that which has been described above, for example cataphoretically or by evaporation.

As has been set out hereinbefore, the invention may be utilized with various combinations of composite lead-in conductors and wall materials. It will furthermore be evident that the invention is not limited to the discharge tubes mentioned in the practical example, but may be applied to different kinds of sealed vessels of ultra high frequency electronic devices.

What we claim is:

1. A method of making a sealed glass vessel for use as the envelope of an electron discharge device for short waves, which comprises preparing a seal-in conductor for the vessel by covering a wire core with a thin layer of a metal of high conductivity, thereafter applying a coating of chromium of such thinness that the chromium will be converted into chromium oxide during the sealing-in operation, inserting the composite conductor in place to be sealed, and sealing it to the glass vessel.

2. A method of making a sealed glass vessel for use as the envelope of an electron discharge device for short waves, which comprises preparing a seal-in conductor for the vessel by covering a wire core with a thin layer of a metal of high conductivity, thereafter applying to the wire a coating of chromium of from 0.5 to 1 micron which will be converted into chromium oxide during the sealing-in operation, inserting the composite conductor in place to be sealed, and sealing it to the glass vessel.

3. A method of making a sealed glass vessel for use as the envelope of an electron discharge device for short waves, which comprises the steps of preparing a seal-in conductor for the said vessel by electrolytically depositing on a chrome-iron wire core a thin layer of a metal of high conductivity, thereafter electrolytically depositing on the said wire a coating of chromium of from 0.5 to 1 micron thickness which will be converted into chromium oxide during the sealing-in operation, inserting the composite conductor in place to be sealed, and sealing the conductor into the said glass vessel.

JOHAN GEORGE KRONOUER.
EDUARD MARIA HENRICUS LIPS.
FRITS PRAKKE.

REFERENCES CITED

The following references are of record in the file of this patent:

UNITED STATES PATENTS

| Number | Name | Date |
|---|---|---|
| 1,576,436 | Gustin | Mar. 9, 1926 |
| 1,615,585 | Humphries | Jan. 25, 1927 |
| 1,651,278 | Humphries | Nov. 29, 1927 |
| 1,746,987 | Bennett | Feb. 11, 1930 |
| 2,217,422 | Scott | Oct. 8, 1940 |
| 2,420,291 | Adler | May 13, 1947 |

FOREIGN PATENTS

| Number | Country | Date |
|---|---|---|
| 23,404 | Great Britain | 1910 |
| 379,883 | Great Britain | Sept. 8, 1932 |